United States Patent
Salomone et al.

(10) Patent No.: US 8,995,941 B2
(45) Date of Patent: *Mar. 31, 2015

(54) METHODS AND APPARATUS FOR IMPROVED SCANNING OF A RADIO FREQUENCY (RF) BAND FOR WLANS IN AN UNKNOWN REGULATORY DOMAIN

(71) Applicant: BlackBerry Limited, Waterloo (CA)

(72) Inventors: Leonardo Jose Silva Salomone, Waterloo (CA); Michael Peter Montemurro, Waterloo (CA)

(73) Assignee: BlackBerry Limited, Waterloo (CA)

( * ) Notice: Subject to any disclaimer, the term of this patent is extended or adjusted under 35 U.S.C. 154(b) by 46 days.

This patent is subject to a terminal disclaimer.

(21) Appl. No.: 13/855,300

(22) Filed: Apr. 2, 2013

(65) Prior Publication Data

US 2013/0229923 A1 Sep. 5, 2013

Related U.S. Application Data

(63) Continuation of application No. 11/552,022, filed on Oct. 23, 2006, now Pat. No. 8,433,312.

(51) Int. Cl.
| | |
|---|---|
| *H04B 1/18* | (2006.01) |
| *H04W 4/00* | (2009.01) |
| *H04M 1/00* | (2006.01) |
| *H04W 48/16* | (2009.01) |
| *H04W 52/02* | (2009.01) |

(52) U.S. Cl.
CPC .......... *H04W 48/16* (2013.01); *H04W 52/0216* (2013.01); *H04W 52/0219* (2013.01); *H04W 52/0229* (2013.01); *Y02B 60/50* (2013.01)

USPC .............. 455/150.1; 455/161.1; 455/434; 455/515

(58) Field of Classification Search
CPC ............ H04W 48/16; H04W 52/0216; H04W 52/0229; H03J 1/0091; H03J 7/18; H03J 7/30
USPC ......... 455/161.1, 515–516, 434, 150.1, 161.2
See application file for complete search history.

(56) References Cited

U.S. PATENT DOCUMENTS

| | | | | |
|---|---|---|---|---|
| 3,824,475 | A | * | 7/1974 | Pflasterer .................. 455/164.1 |
| 5,040,237 | A | * | 8/1991 | Barnes et al. .................... 455/8 |
| 6,308,068 | B1 | * | 10/2001 | Kunkel ......................... 455/434 |

(Continued)

OTHER PUBLICATIONS

Parent U.S. Appl. No. 11/552,022, filed Oct. 23, 2006; now issued Patent No. 8433312 Title: Methods and Apparatus for Scanning Radio Frequency Bands in Wireless Local Area Networks.

*Primary Examiner* — Simon Nguyen
(74) *Attorney, Agent, or Firm* — Perry + Currier Inc.

(57) ABSTRACT

Techniques are described for use in scanning by a mobile device which is configured to communicate in compliance with regulatory requirements of a regulatory domain based on country information communicated in one or more beacon frames. The mobile device scans a radio frequency (RF) band using passive scan operations on RF channels having passive scan status, where each passive scan operation involves monitoring an RF channel in attempt to decode a beacon frame. When the mobile device successfully decodes, on an RF channel for a passive scan operation, an information frame of a type that is different from a beacon frame, it changes the passive scan status of the RF channel to an active scan status and performs an active scan operation on the RF channel.

20 Claims, 4 Drawing Sheets

(56) References Cited

U.S. PATENT DOCUMENTS

| | | | |
|---|---|---|---|
| 6,553,229 B1 * | 4/2003 | Dent | 455/434 |
| 7,149,521 B2 * | 12/2006 | Sundar et al. | 455/435.1 |
| 8,254,332 B2 * | 8/2012 | Bertorelle et al. | 370/331 |
| 8,483,105 B2 * | 7/2013 | Nanda et al. | 370/278 |
| 2004/0111663 A1 * | 6/2004 | Lewis | 714/776 |
| 2007/0237121 A1 * | 10/2007 | Khandelwal et al. | 370/338 |

* cited by examiner

| Frame Control | Duration/ ID | Address1 | Address2 | Address3 | Sequence Control | Address4 | Frame Body | FCS |
|---|---|---|---|---|---|---|---|---|
| Octets:2 | 2 | 6 | 6 | 6 | 2 | 6 | 0-2312 | 4 |

Table 4A
802.11 General Frame Format

| Frame Control | Duration | RA | TA | FCS |
|---|---|---|---|---|
| Octets:2 | 2 | 6 | 6 | 4 |

Table 4B
802.11 Control Frame Format

| Frame Control | Duration/ ID | Address1 | Address2 | Address3 | Sequence Control | Address4 | Frame Body | FCS |
|---|---|---|---|---|---|---|---|---|
| Octets:2 | 2 | 6 | 6 | 6 | 2 | 6 | 0-2312 | 4 |

Table 4C
802.11 Data Frame Format

| Frame Control | Duration | DA | SA | BSSID | Sequence Control | Frame Body | FCS |
|---|---|---|---|---|---|---|---|
| Octets:2 | 2 | 6 | 6 | 6 | 2 | 0-2312 | 4 |

Table 4D
802.11 Management Frame Format

FIG. 4

METHODS AND APPARATUS FOR IMPROVED SCANNING OF A RADIO FREQUENCY (RF) BAND FOR WLANS IN AN UNKNOWN REGULATORY DOMAIN

CROSS-REFERENCE TO RELATED APPLICATION

The present application is a continuation of and claims priority to U.S. non-provisional patent application Ser. No. 11/552,022 and filing date of 23 Oct. 2006, which is hereby incorporated by reference herein.

BACKGROUND

1. Field of the Technology

The present disclosure relates generally to mobile communication devices which communicate with wireless communication networks such as wireless local area networks (WLANs), and more particularly to improved scanning methods and apparatus of a radio frequency (RF) band for WLANs in an unknown regulatory domain.

2. Description of the Related Art

In wireless communication networks, such as wireless local area networks (WLANs) which operate in accordance with 802.11-based standards, a mobile communication device scans radio frequency (RF) channels of an RF band to identify information about the local WLANs. Scanning may be performed in either a passive scan mode or an active scan mode. The passive scan mode utilizes a wireless receiver of the mobile device to monitor RF channels for a beacon frame from any wireless APs of the WLAN. On the other hand, the active scan mode utilizes a wireless transmitter of the mobile device to transmit a probe request and the wireless receiver to monitor the RF channel for any probe responses from wireless APs of the WLAN.

In each country or region of mobile device operation, the use of RF bands are regulated and defined by regulatory bodies of the country or region (e.g. the FCC in the US and Canada). However, the mobile device may be operating for the first time in one of several different countries or regions where regulatory domain information for the RF band is unknown. When regulatory domain information is unknown, the passive scan mode of the mobile device is required as some RF channels are reserved for non-WLAN operations in certain regions. When regulatory domain information for a region is known, active scan modes of the mobile device are allowed as defined by the domain. Use of a passive scan operation is less efficient than an active scan operation while waiting to obtain such regulatory domain information. As apparent, regular use of the passive scan operation significantly increases battery power consumption of the mobile device while the regulatory domain information is unknown.

Accordingly, what are needed are methods and apparatus for efficient scanning of RF bands in unknown regulatory domains for mobile devices operative in WLANs.

BRIEF DESCRIPTION OF THE DRAWINGS

Embodiments of present invention will now be described by way of example with reference to attached figures, wherein.

DETAILED DESCRIPTION OF THE PREFERRED EMBODIMENTS

Methods and apparatus for use in scanning a radio frequency (RF) band for wireless local area networks (WLANs) while regulatory information for the RF band is unknown are described herein. A mobile communication device includes one or more processors and a wireless transceiver coupled to the one or more processors. In one illustrative embodiment, a processor of the mobile device utilizes the wireless transceiver to cause the RF band to be scanned using a passive scan operation on RF channels having a passive scan status. During the passive scan operation, the processor attempts to decode an information frame on the RF channel. In response to successfully decoding an information frame on the RF channel during the passive scan operation, the processor changes the passive scan status of the RF channel to an active scan status, and causes an active scan operation to be performed on the RF channel having the active scan status. The information frame that is successfully decoded may be any suitable frame of the WLAN protocol, such as a control, data, and/or management frame from a WLAN or even from other mobile device. The processor utilizes its wireless transceiver to scan additional RF channels of the RF band in the same manner, using the passive scan operation or the active scan operation based on the scan status of each RF channel. The scanning process may continue until regulatory information for the RF band is received. Advantageously, scanning an RF band for WLANs is made more efficient and power consumption of the mobile device is reduced.

More generally, a method for use in scanning a radio frequency (RF) band for a wireless communication network by a mobile communication device may include the steps of scanning RF channels of the RF band in accordance with a first scan mode (e.g. a passive scan mode) and, during the scanning in accordance with the first scan mode, identifying whether valid information exists on an RF channel of the RF band (e.g. identifying whether a valid information frame or valid information has been decoded), and scanning RF channels of the RF band in accordance with a second scan mode (e.g. an active scan mode) in response to identifying that valid information exists on the RF channel of the RF band. Although no wireless networks may yet be identified or found for communication during scanning in the first and the second scan modes, scanning in accordance with the second (e.g. active) scan mode causes the mobile communication device to consume less power than scanning in accordance with the first (e.g. passive) scan mode.

Figure 1:
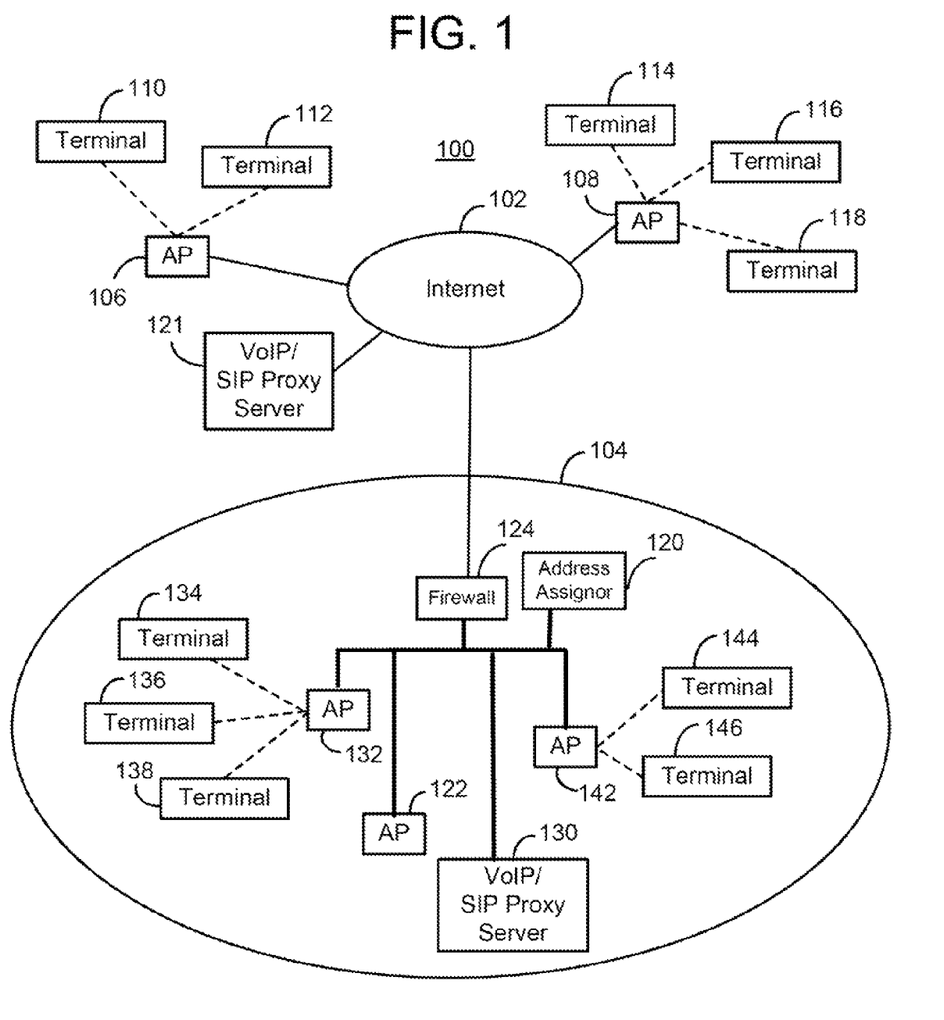
FIG. 1 is a block diagram which illustrates a communication system which includes a communication network having a wireless local area network (WLAN) with a plurality of wireless access points (APs)

To illustrate basic network architecture, FIG. 1 shows a diagram of a communication system 100 which includes a public network 102 (e.g. the Internet) and a private network 104. A firewall 124 may be provided in private network 104 for preventing unauthorized access from users in public network 102. In the present embodiment private network 104 is or includes a wireless local area network (WLAN). In the WLAN, terminals may connect to their associated networks through access points (APs) as shown. Preferably, at least some of the APs are wireless APs of the WLAN and at least some of the terminals are mobile/wireless communication devices which interface and connect through these wireless APs. Such terminals and APs may operate in accordance with well-known IEEE 802.11 standards. The terminals shown in public network 102 include terminals 110 and 112 which have interfaced with AP 106, and terminals 114, 116, and 118 which have interfaced with AP 108. The terminals shown in private network 104 include terminals 134, 136, 138 which have interfaced with AP 132 and terminals 144 and 146 which have interfaced with AP 142.

Private network 104 which includes the WLAN provides various data and communication services to its terminals. For example, private network 104 may provide for voice telephony communication services for its terminals with use of Voice over IP (VoIP) communications. For these types of services, private network 104 may utilize a VoIP server architecture for VoIP communication sessions, and/or an e-mail server architecture for e-mail message communications, as examples. For these purposes, communication system 100 may also include at least one VoIP or Session Initiation Protocol (SIP) proxy server. In the present embodiment, communication system 100 has a VoIP or SIP proxy server 121 in public network 102 and a VoIP or SIP proxy server 130 in private network 104. Note that some communication applications utilized by terminals, such VoIP applications, require the use of SIP. SIP is well-documented in standard documents such as Request For Comments (RFC) 3261.

Figure 2:
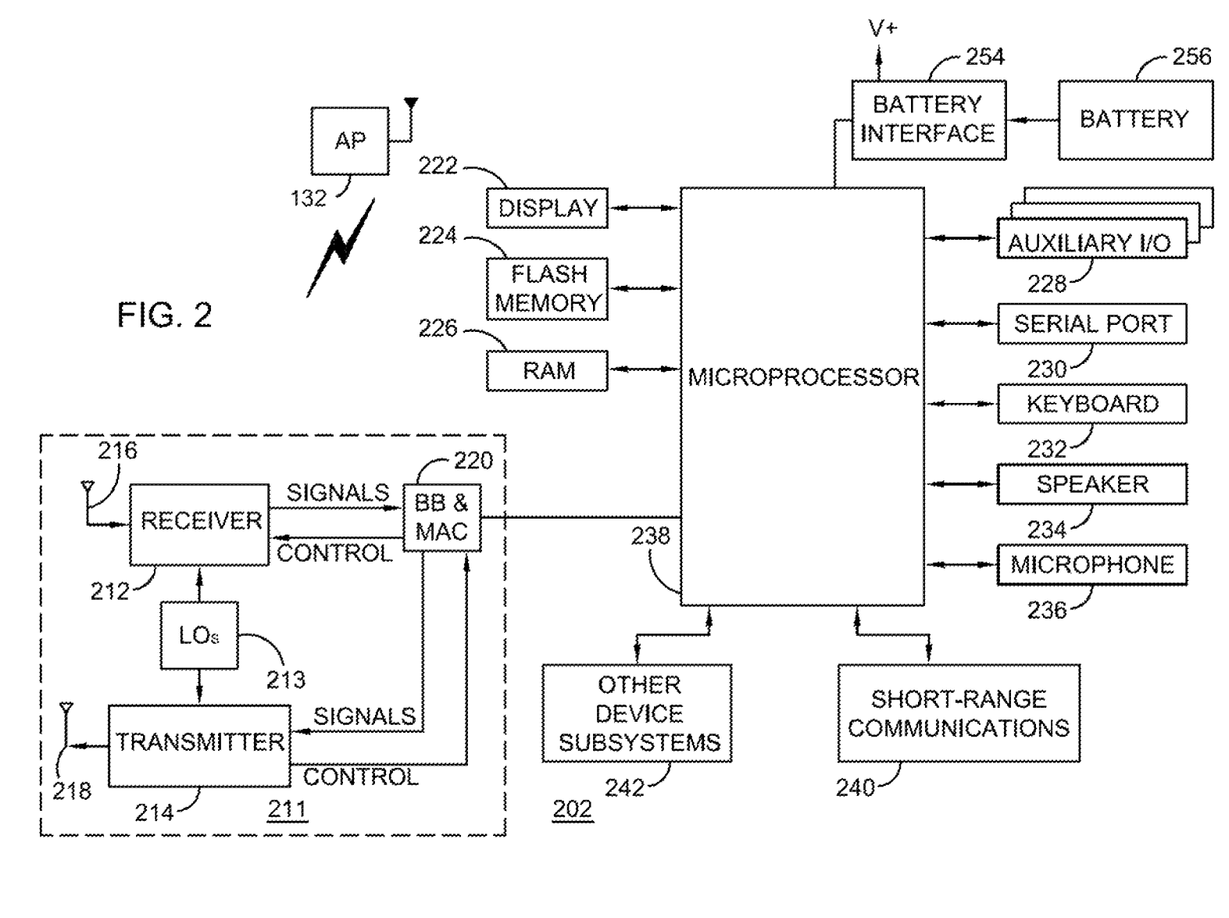
FIG. 2 is a more detailed schematic diagram of the mobile communication devices of FIG. 1, namely, a mobile station of the preferred embodiment.

Referring now to FIG. 2, electrical components of a typical mobile communication device 202 (e.g. a mobile station) which operates with wireless APs of communication system 100 of FIG. 1 will be described. Mobile station 202 may be representative of one or more terminals shown and described in relation to FIG. 1. Mobile station 202 is preferably a two-way communication device having at least voice and advanced data communication capabilities, including the capability to communicate with other computer systems. Also preferably, mobile station 202 is a wireless communication device which operates in accordance with an IEEE 802.11 standards. Depending on the functionality provided by mobile station 202, it may be referred to as a data messaging device, a two-way pager, a cellular telephone with data messaging capabilities, a wireless Internet appliance, or a data communication device (with or without telephony capabilities).

As shown in FIG. 2, mobile station 202 is adapted to wirelessly communicate with wireless APs such as AP 132. For communication with such wireless APs, mobile station 202 utilizes communication subsystem 211. Depending on the type of device, mobile station 202 may also be adapted to wirelessly communicate with other systems such as cellular telecommunication systems. With such configuration, mobile station 202 may be referred to as a "dual mode" mobile station. Although mobile station 202 may have separate and independent subsystems for these purposes, at least some portions or components of these otherwise different subsystems may be shared where possible. Note, however, that the scanning techniques of the present disclosure do not require that mobile station 202 be any type of dual mode device.

Communication subsystem 211 includes a receiver 212, a transmitter 214, and associated components, such as one or more (preferably embedded or internal) antenna elements 216 and 218, local oscillators (LOs) 213, and a processing module such as a baseband (BB) and media access control (MAC) processing module 220. As will be apparent to those skilled in the field of communications, the particular design of communication subsystem 211 depends on the communication network in which mobile station 202 is intended to operate. In the present disclosure, communication subsystem 211 (including its associated processor/processing components) are operative in accordance with IEEE 802.11 standards.

Mobile station 202 may send and receive communication signals through the network after required network procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in BB/MAC processing module 220. In a similar manner, signals to be transmitted are processed, including modulation and encoding, for example, by BB/MAC processing module 220. These processed signals are input to transmitter 214 for digital-to-analog (D/A) conversion, frequency up conversion, filtering, amplification and transmission through the network via antenna 218. BB/MAC processing module 220 not only processes communication signals, but may also provide for receiver and transmitter control.

Note that receiver 212 and transmitter 214 may share one or more antennas through an antenna switch (not shown in FIG. 2), instead of having two separate dedicated antennas 216 and 218 as shown.

Since mobile station 202 may be a portable battery-powered device, it also includes a battery interface 254 for receiving one or more rechargeable batteries 256. Such a battery 256 provides electrical power to most if not all electrical circuitry in mobile station 202, and battery interface 254 provides for a mechanical and electrical connection for it. Battery interface 254 is coupled to a regulator (not shown in FIG. 2) that provides a regulated supply voltage V to all of the circuitry.

Mobile station 202 includes a microprocessor 238 (one type of processor or controller) that controls overall operation of mobile station 202. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications that control basic device operations, including at least data and voice communication applications, will normally be installed on mobile station 202 during its manufacture. A preferred application that may be loaded onto mobile station 202 may be a personal information manager (PIM) application having the ability to organize and manage data items relating to user such as, but not limited to, e-mail, calendar events, voice mails, appointments, and task items. Naturally, one or more memory stores are available on mobile station 202 and SIM 256 to facilitate storage of PIM data items and other information.

The PIM application preferably has the ability to send and receive data items via the wireless network. In a preferred embodiment, PIM data items are seamlessly integrated, synchronized, and updated via the wireless network, with the wireless device user's corresponding data items stored and/or associated with a host computer system thereby creating a mirrored host computer on mobile station 202 with respect to such items. This is especially advantageous where the host computer system is the wireless device user's office computer system. Additional applications may also be loaded onto mobile station 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile station 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211. For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication. Short-range communications subsystem 240 of FIG. 2 is an additional optional component that provides for communication between mobile station 202 and different systems or devices, which need not necessarily be similar devices. For example, subsystem 240 may include an infrared device and associated circuits and components, or a Bluetooth™ communication module to provide for communication with similarly enabled systems and devices. Bluetooth™ is a registered trademark of Bluetooth SIG, Inc.

Although a specific mobile station 202 has just been described, any suitable mobile communication device or terminal may be part of the inventive methods and apparatus which will be described in fuller detail below. Note that many components of mobile station 202 shown and described may not be included.

Figure 3:
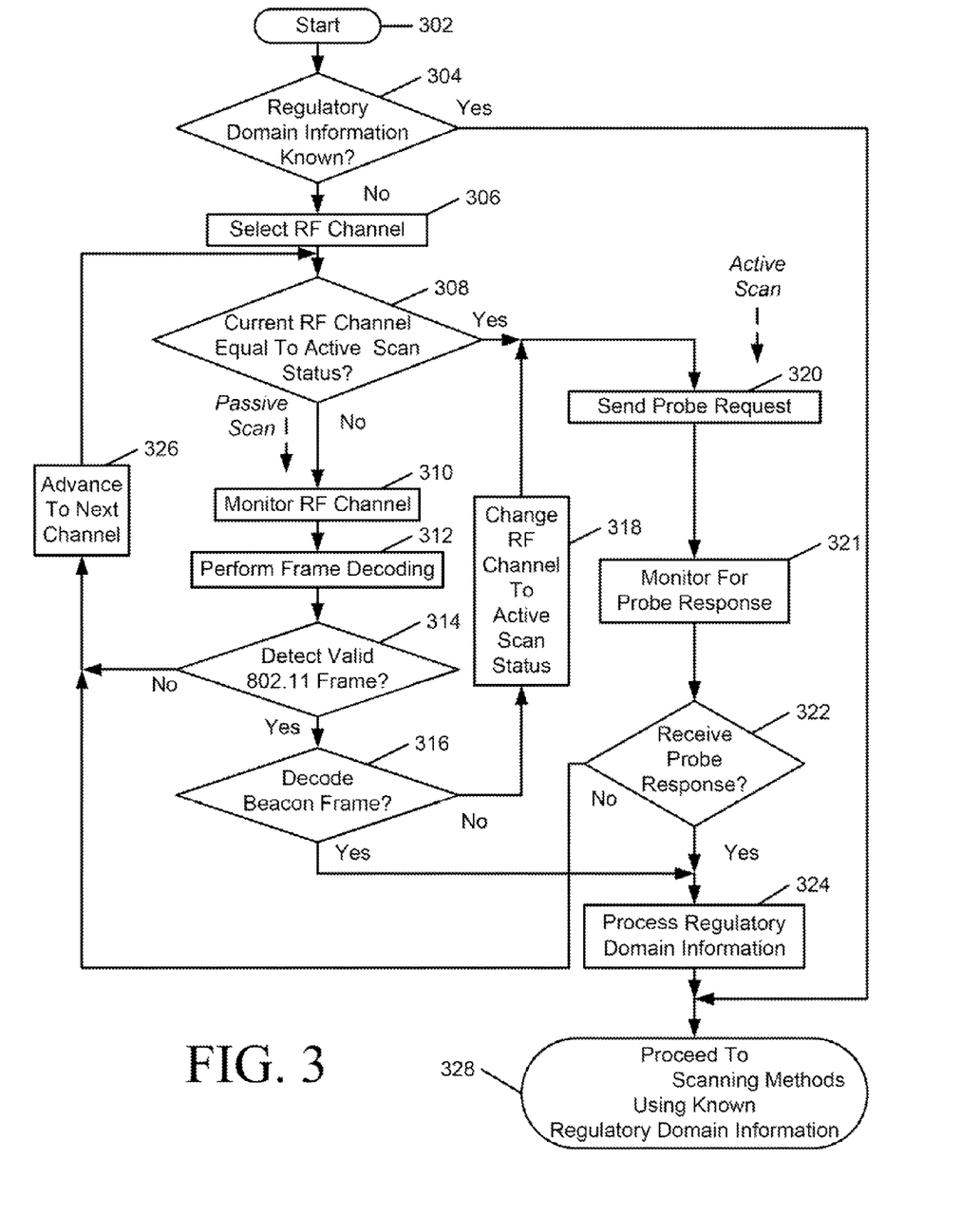
FIG. 3 is a flowchart of a scanning method for a mobile communication device operating in an unknown regulatory domain.

FIG. 3 is a flowchart of a method for scanning a radio frequency (RF) band for WLANs while regulatory information for the RF band is unknown to a mobile communication device. The method of FIG. 3 may be performed by a mobile station, and/or be embodied in a computer program product which includes a computer readable medium (e.g. memory) and computer instructions stored in the storage medium which are executable by one or more processors.

Typically, regulatory information (e.g. regulatory domain information) is provided by a wireless AP of a WLAN as part of the information in a beacon frame or probe response transmitted by the wireless AP. In each country or region of mobile station operation, the use of RF bands are regulated and defined by regulatory bodies of the country or region (e.g. the FCC in the US and Canada). The regulatory domain information instructs the mobile station which RF channels may be utilized, and how they may be utilized, for WLAN communications. However, the mobile station may be operating for the first time in one of several different countries or regions where regulatory domain information of the RE band has not yet been (timely) received and is unknown. When regulatory domain information is unknown, a passive scan mode is required as some RF channels are reserved for non-WLAN operations in certain regions. When regulatory domain information for a region is known, active scan modes are allowed as defined by the domain. Even after the regulatory domain information becomes known, however, the mobile station may later deem the regulatory domain and information to be unknown again in response to identifying certain conditions, such as an out-of-coverage condition for a predetermined (relatively long) time period.

The passive scan mode utilizes the receiver of the mobile station to monitor RF channels for a beacon frame from any wireless APs of the WLAN. On the other hand, the active scan mode utilizes the transmitter of the mobile station to transmit a probe request and the receiver to monitor the RF channel for any probe responses from wireless APs of the WLAN. Note that the use of the passive scan mode is less efficient than the active scan mode while waiting to obtain such regulatory domain information. The mobile station may be out-of-coverage with a primary WLAN for some time before obtaining regulatory information. As apparent, regular use of the passive scan mode operation significantly increases battery power consumption of the mobile station while the regulatory domain information is unknown.

To help alleviate this problem, the steps shown in the flowchart of FIG. 3 describe a general process for scanning an RF band for WLANs prior to receiving regulatory information according to the present disclosure. The process described in the flowchart shown in FIG. 3 makes use of detected, valid RF communications from a WLAN or even from another mobile device to change a passive scan status of an RF channel to an active scan status. The particular steps and sequence of steps of the method may vary depending on the specific architecture utilized.

The discussion of FIG. 3 may make reference to FIGS. 1, 2, 4 and 5 in combination. Beginning at a start block 302 of FIG. 3 the processor of the mobile station determines if regulatory domain information is known (step 304 of FIG. 3). If the regulatory domain information is deemed known, the processor is operative to proceed to other scanning techniques, conventional or otherwise, using the known regulatory domain information (step 328 of FIG. 3). Such conventional scanning methods for mobile stations of WLANs are well documented in standards documents for 802.11 based networks, for example. Note that even when the regulatory domain information becomes known, however, the mobile station may later deem the regulatory domain and information to be unknown again in response to identifying certain conditions, such as an out-of-coverage condition for a predetermined (relatively long) time period.

If regulatory domain information is deemed unknown at step 304, the processor of the mobile station selects an RF channel to begin a scanning procedure (step 306 of FIG. 3). During the scanning procedure, the processor makes use of the wireless transceiver to monitor usable RF channels of a WLAN in attempt to detect any WLAN information frame on an RF channel within an operating region. After an RF channel has been initially selected in step 306, the processor determines if the RF channel which is currently selected is designated as a passive scan channel or an active scan channel (step 308 of FIG. 3). Such scanning status of each RF channel may be stored in memory of the mobile station associated with RF channel information for the RF channel (e.g. as data or bit indication).

If the current RF channel is identified as having an active scan status, the processor utilizes an active scan operation on the RF channel for scanning. Here, the processor causes a probe request to be transmitted on the RF channel (step 320 of FIG. 3). After the probe request is transmitted, for a predefined time period the processor is operative to utilize the receiver to monitor the RF channel for a probe response from a wireless AP of a WLAN (step 321 of FIG. 3). If, after a predefined time period, a probe response is not received (as identified in step 322 of FIG. 3), the processor causes the transceiver to advance to a next RF channel (step 326 of FIG. 3) and return to step 308. If a probe response is received through the receiver, the processor receives and processes regulatory domain information included in the probe response (step 324 of FIG. 3). Once regulatory domain information is received and processed, the processor is operative to proceed to the scanning techniques using the known regulatory domain information (step 328 of FIG. 3).

If the current RF channel is identified as having a passive scan status in step 308, however, the processor utilizes a passive scan operation on the RF channel for scanning. In particular, the processor causes the receiver to monitor the present RF channel for any RF signals containing valid information frames (step 310 of FIG. 3). The transmitter is not utilized during the passive scan operation, RF signals containing valid information frames may be received by the mobile station from any other mobile station or wireless AP of a WLAN within its RF coverage range. Next, the processor causes a decoding process for frame decoding to be performed on the received signals (step 312 of FIG. 3). The decoding process attempts to decode any suitable information frame associated with the WLAN protocol, such as a control, data, and/or management frame from a WLAN or even from other mobile device. Such information frames and decoding of the same will be described later in relation to FIG. 4.

If a valid information frame is not decoded (as identified in step 314 of FIG. 3), the processor causes the transceiver to advance to a next RF channel (step 326 of FIG. 3) and return to step 308 for scanning of the next RF channel. If a valid 802.11 information frame is decoded as identified in step 314, however, the processor determines if the decoded 802.11 frame is a beacon frame (step 316 of FIG. 3). A beacon frame, which is a well-defined 802.11 information frame transmitted by wireless APs of a WLAN, typically includes regulatory domain information. A beacon frame is typically transmitted periodically by wireless APs to provide various information including regulatory domain information. If the processor identifies a beacon frame, the processor then processes the regulatory domain information to determine the permissible scanning/transmission activities of the RF band in accordance with the regulatory domain information (step 324 of FIG. 3). Once regulatory domain information is received and processed, the processor is operative to proceed to scanning techniques based on the known regulatory domain information (step 328 of FIG. 3).

If the information frame is not a beacon frame, the information frame is nonetheless a validly decoded information frame and therefore valid WLAN-based activity has been detected on the RF channel. In response, the processor changes the scan status of the current RF channel from passive scan status to active scan status (step 318 of FIG. 3). After the processor assigns the current RF channel to active scan status in step 318, the processor advances to perform an active scan operation at step 320. As described earlier, active scan operation is allowed on RF channels known to be reserved for WLAN usage in a region. Detection of any WLAN signaling (e.g. valid 802.11-based WLAN information frames) (e.g. earlier in step 314 of FIG. 3) indirectly indicates that the RF channel is designated as a WLAN channel in the region which permits use of the active scan operation. Thus, scanning is made more efficient and power consumption of the mobile device is reduced.

Figure 4:
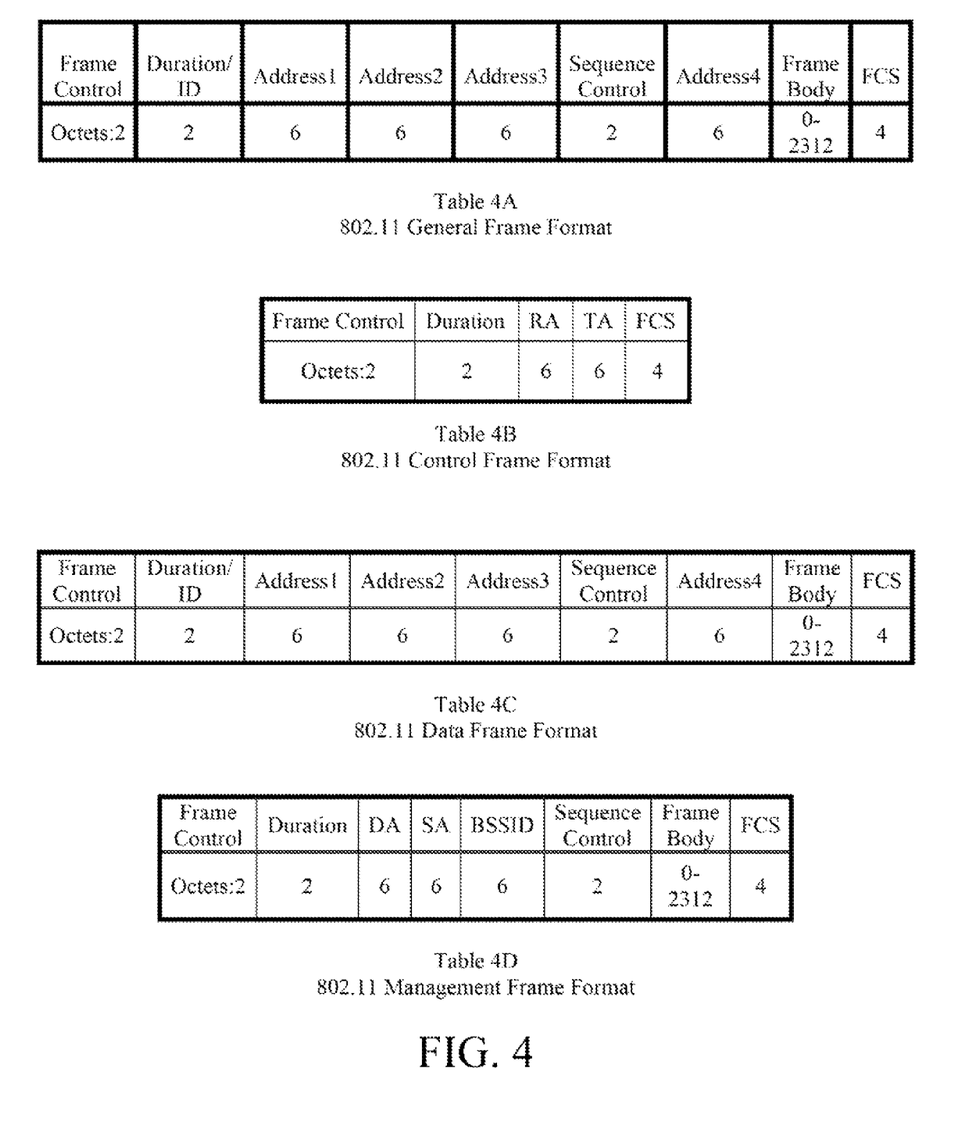
FIG. 4 is an illustration of frame formatting of information frames for a particular wireless communication network, namely a WLAN.

Related to steps 310 and 312 above, a general frame format for an information frame according to 802.11-based networks is shown in Table 4A of FIG. 4. Other 802.11-based frame formats shown in FIG. 4 include control frame formats, data frame formats, and management frame formats in Tables 4B, 4C and 4D, respectively. Control frame format of Table 4B is a request to send (RTS) frame, which is one example of a WLAN control frame. For use in decoding in step 314 of FIG. 3, each WLAN frame format shown in FIG. 4 contains a WLAN-specific checksum within the frame format. In the example frame format tables shown in FIG. 4, the checksum is a frame check sequence (FCS). An FCS is defined in 802.11 WLAN standards as extra checksum characters added to an information frame. The FCS within the information frame consists of final four bytes of the information frame, A cyclic redundancy check (CRC) may be used to compute the FCS. Typically, a transmitting device computes a checksum on the entire information frame and sends this along with the frame. A receiving device (e.g. the mobile station) computes the checksum on the frame using the same algorithm, and compares it to the received FCS. This way, the receiving device is able to detect whether any data was lost or altered in transit. If the checksum or CRC matches correctly, then the information frame has been successfully decoded and is valid; if not, then the information frame has not been successfully decoded and is invalid. The checksum or CRC may be referred to more generally as an error detection code.

As indicated earlier, passive scan operations may consume more time than active scan operations and are therefore less desirable to utilize due to increased power consumption. Detection of any RF communications signals containing WLAN information frames to change the scan status of RF channels from passive scan mode to active scan mode may decrease scanning procedure times. A more efficient scanning procedure of the present disclosure therefore reduces battery power consumption while the mobile station is attempting to acquire regulatory domain information.

Thus, methods and apparatus for use in scanning a radio frequency (RF) band for wireless local area networks (WLANs) while regulatory information for the RF band is unknown have been described. A mobile communication device includes one or more processors and a wireless transceiver coupled to the one or more processors. A processor of the mobile device utilizes the wireless transceiver to cause the RF band to be scanned using a passive scan operation on an RF channel having a passive scan status. During the passive scan operation, the processor attempts to decode an information frame on the RF channel. In response to successfully decoding an information frame on the RF channel during the passive scan operation, the processor changes the passive scan status of the RF channel to an active scan status, and causes an active scan operation to be performed on the RF channel having the active scan status. The information frame that is successfully decoded may be any suitable frame of the WLAN protocol, such as a control, data, and/or management frame from a WLAN or even from other mobile device. The processor utilizes its wireless transceiver to scan additional RF channels of the RF band in the same manner, using the passive scan operation or the active scan operation based on the scan status of each RF channel. The scanning process may continue until regulatory information for the RF band is received via a MAN. Advantageously, scanning an RF band for WLANs is made more efficient and power consumption of the mobile device is reduced.

More generally, a method for use in scanning a radio frequency (RF) band for a wireless communication network by a mobile communication device may include the steps of scanning RF channels of the RF band in accordance with a first scan mode (e.g. a passive scan mode) and, during the scanning in accordance with the first scan mode, identifying whether valid information exists on an RF channel of the RF band (e.g. identifying whether a valid information frame or valid information has been decoded), and scanning RF channels of the RF band in accordance with a second scan mode (e.g. an active scan mode) in response to identifying that valid information exists on the RF channel of the RF band. Although no wireless networks may yet be identified or found for communication during scanning in the first and the second scan modes, scanning in accordance with the second (e.g. active) scan mode causes the mobile communication device to consume less power than scanning in accordance with the first (e.g. passive) scan mode.

The above-described embodiments of the present disclosure are intended to be examples only. Those of skill in the art may effect alterations, modifications and variations to the particular embodiments without departing from the scope of the application. For example, although 802.11-based networks have been described in the preferred embodiment, other suitable network technologies may be utilized such as 802.16-based network (i.e. WiMAX) technologies. The invention described herein in the recited claims intends to cover and embrace all suitable changes in technology.

The invention claimed is:

1. A method of scanning by a mobile device which is configured to communicate in compliance with regulatory requirements of a regulatory domain based on country information communicated in one or more beacon frames, the method comprising:

scanning a radio frequency (RF) band using passive scan operations on RF channels having passive scan status, wherein each passive scan operation comprises monitoring an RF channel in attempt to decode a beacon frame; and in response to successfully decoding, on an RF channel for a passive scan operation, an information frame of a type that is different from a beacon frame, changing the passive scan status of the RF channel to an active scan status and performing an active scan operation on the RF channel.

2. The method of claim 1, further comprising:

in response to unsuccessfully decoding an information frame on the RF channel for the passive scan operation, maintaining the passive scan status of the RF channel.

3. The method of claim 1, wherein the information frame that is successfully decoded comprises one of a data frame or a control frame.

4. The method of claim 1, wherein the information frame that is successfully decoded comprises an information frame received from another mobile communication device.

5. The method of claim 1, wherein decoding further comprises performing a decoding process with use of an error detection code.

6. The method of claim 1 wherein attempting to decode further comprises:

receiving a checksum of an information frame;
computing a checksum for the information frame; and
when the received checksum and the computed checksum match, identifying that the information frame of the type that is different from the beacon frame is successfully decoded.

7. The method of claim 1 further comprising:

after changing the passive scan status on the RF channel to the active scan status:

receiving, in one or more beacon frames, the country information; and
performing the scanning in accordance with the regulatory information.

8. The method of claim 1, wherein the passive and active scan operations are performed in accordance with IEEE 802.11 standards.

9. The method of claim 1, wherein the beacon frame and the information frame are formatted in accordance with IEEE 802.11 standards.

10. The method of claim 1, wherein changing the passive scan status of the RF channel to an active scan status and performing an active scan operation on the RF channel are performed prior to receiving any country information which indicates the regulatory domain of operation.

11. A mobile communication device configured to communicate in compliance with regulatory requirements of a regulatory domain based on country information communicated in one or more beacon frames, the mobile communication device comprising:

one or more processors;
a radio frequency (RF) transceiver coupled to the one or more processors and configured for communications in an RF band;
the one or more processors being configured to:

cause scanning to be performed in the RF band, with use of the RF transceiver, using passive scan operations on RF channels having passive scan status, wherein each passive scan operation comprises monitoring an RF channel in attempt to decode a beacon frame; and in response to successfully decoding, on an RF channel for a passive scan operation, an information frame of a type that is different from a beacon frame, change the passive scan status of the RF channel to an active scan status and perform an active scan operation on the RF channel.

12. The mobile communication device of claim 11, wherein the one or more processors are further configured to in response to unsuccessfully decoding an information frame on the RF channel for the passive scan operation, maintain the passive scan status of the RF channel.

13. The mobile communication device of claim 11, wherein the one or more processors are further configured to decode by performing a decoding process with use of an error detection code.

14. The mobile communication device of claim 11, wherein the one or more processors are further configured to decode by:

receiving a checksum of an information frame;

computing a checksum for the information frame; and when the received checksum and the computed checksum match, identifying that the information frame of the type that is different from the beacon frame is successfully decoded.

15. The mobile communication device of claim 11, wherein the one or more processors are further configured to:
perform the active scan operation on the RF channel by:
causing a probe request to be transmitted on the RF channel; and
monitoring for a probe response in response to transmitting the probe request.

16. The mobile communication device of claim 11, wherein the passive and active scan operations are performed in accordance with IEEE 802.11 standards.

17. The mobile communication device of claim 11, wherein the one or more processors are further configured to:
after changing the passive scan status on the RF channel to the active scan status:
receive, in the one or more beacon frames, the country information; and
perform the scanning in accordance with the country information.

18. The mobile communication device of claim 11, wherein the information frame comprises one of a data frame or a control frame.

19. The mobile communication device of claim 11, wherein the one or more processors are configured to change the passive scan status of the RF channel to an active scan status and perform an active scan operation on the RF channel prior to receiving any country information which indicates the regulatory domain of operation.

20. The mobile communication device of claim 11, wherein the information frame that is successfully decoded comprises an information frame received from another mobile communication device.

* * * * *